(12) United States Patent
Perez-Rovira

(10) Patent No.: US 11,669,604 B2
(45) Date of Patent: Jun. 6, 2023

(54) METHODS AND SYSTEMS FOR AUTHENTICATING A USER

(71) Applicant: Daon Enterprises Limited, Floriana (MT)

(72) Inventor: Adria Perez-Rovira, Barcelona (ES)

(73) Assignee: Daon Technology, Dublin (IE)

(*) Notice: Subject to any disclaimer, the term of this patent is extended or adjusted under 35 U.S.C. 154(b) by 581 days.

(21) Appl. No.: 16/435,595

(22) Filed: Jun. 10, 2019

(65) Prior Publication Data
US 2020/0387587 A1    Dec. 10, 2020

(51) Int. Cl.
*G06F 21/31* (2013.01)
*G06F 18/214* (2023.01)
*G06F 18/2411* (2023.01)
*G06V 40/10* (2022.01)

(52) U.S. Cl.
CPC ........ *G06F 21/316* (2013.01); *G06F 18/2148* (2023.01); *G06F 18/2411* (2023.01); *G06V 40/10* (2022.01)

(58) Field of Classification Search
CPC .. G06F 21/316; G06K 9/6257; G06K 9/6269; G06K 9/6271; G06K 9/6284; G06K 9/6256; G06V 10/82; G06V 40/10
USPC .......................................................... 726/19
See application file for complete search history.

(56) References Cited

U.S. PATENT DOCUMENTS

| | | | |
|---|---|---|---|
| 4,805,222 A * | 2/1989 | Young ...................... | G07C 9/35 382/209 |
| 2006/0280339 A1* | 12/2006 | Cho ......................... | G07C 9/37 382/115 |
| 2009/0150992 A1* | 6/2009 | Kellas-Dicks ......... | G06F 21/316 726/19 |
| 2019/0311261 A1* | 10/2019 | Baldwin ................... | G06N 3/08 |
| 2020/0233939 A1* | 7/2020 | Green ..................... | G06F 21/40 |
| 2020/0280578 A1* | 9/2020 | Hearty .................. | G06F 21/316 |
| 2021/0236044 A1* | 8/2021 | Arroyo-Gallego .. | A61B 5/4023 |

* cited by examiner

*Primary Examiner* — Jacob Lipman
(74) *Attorney, Agent, or Firm* — Kevin McDermott, Esq.

(57) ABSTRACT

A method for authenticating a user is provided that includes capturing, by a computing device, key stroke data generated as a result of a user typing content into the computing device, and calculating feature values from the key stroke data. The method also includes calculating distance scores from the feature values and average distance scores from the distance scores, and entering the average distance scores into a classifier. The user is successfully authenticated when the classifier verifies the identity of the user.

12 Claims, 10 Drawing Sheets

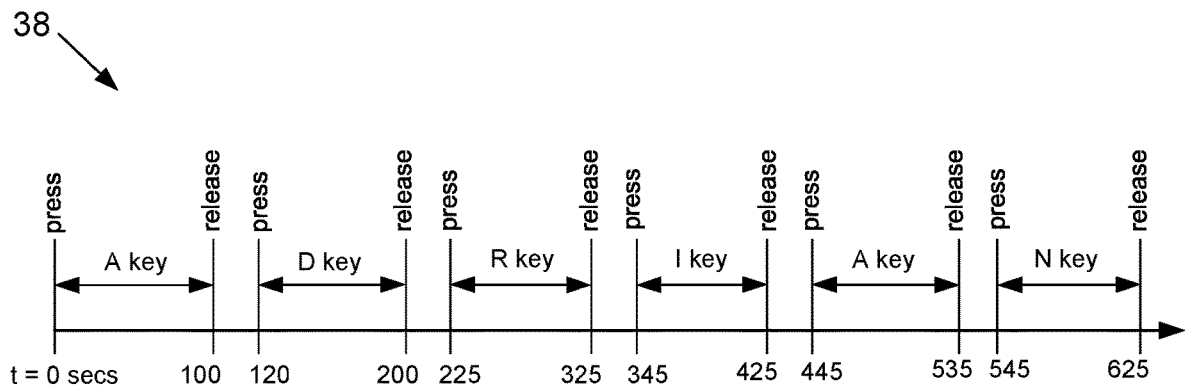

FIG. 2

| KEY STROKE FEATURE TYPES 42 | Key |
|---|---|
| | A |
| Key press duration (ms) | 100 |
| Key press interval (ms) | --- |
| Key press time gap (ms) | --- |
| Key press duration (ms) in relation to the next pressed key | --- |
| Key press interval (ms) in relation to the next pressed key | --- |
| Key press time gap (ms) in relation to the next pressed key | --- |

| KEY STROKE FEATURE TYPES 42 | Keys | | |
|---|---|---|---|
| | A | D | A-D |
| Key press duration (ms) | 100 | 80 | --- |
| Key press interval (ms) | --- | --- | 120 |
| Key press time gap (ms) | --- | --- | 20 |
| Key press duration (ms) in relation to the next pressed key | --- | --- | 100 |
| Key press interval (ms) in relation to the next pressed key | --- | --- | --- |
| Key press time gap (ms) in relation to the next pressed key | --- | --- | --- |

| KEY STROKE FEATURE TYPES 42 | Key | | | | | |
|---|---|---|---|---|---|---|
| | A | D | A-D | R | D-R | A-D-R |
| Key press duration (ms) | 100 | 80 | --- | 100 | --- | --- |
| Key press interval (ms) | --- | --- | 120 | --- | 105 | --- |
| Key press time gap (ms) | --- | --- | 20 | --- | 25 | --- |
| Key press duration (ms) in relation to the next pressed key | --- | --- | 100 | --- | 80 | --- |
| Key press interval (ms) in relation to the next pressed key | --- | --- | --- | --- | --- | 120 |
| Key press time gap (ms) in relation to the next pressed key | --- | --- | --- | --- | --- | 20 |

| KEY STROKE FEATURE TYPES 42 | Key | | | | | | | | |
|---|---|---|---|---|---|---|---|---|---|
| | A | D | A-D | R | D-R | A-D-R | I | R-I | D-R-I |
| Key press duration (ms) | 100 | 80 | --- | 100 | --- | --- | 80 | --- | --- |
| Key press time gap (ms) | --- | --- | 120 | --- | 105 | --- | --- | 120 | --- |
| Key press interval (ms) | --- | --- | 20 | --- | 25 | --- | --- | 20 | --- |
| Key press duration (ms) in relation to the next pressed key | --- | --- | 100 | --- | 80 | --- | --- | 100 | --- |
| Key press interval (ms) in relation to the next pressed key | --- | --- | --- | --- | --- | 120 | --- | --- | 105 |
| Key press time gap (ms) in relation to the next pressed key | --- | --- | --- | --- | --- | 20 | --- | --- | 25 |

| KEY STROKE FEATURE TYPES 42 | Key | | | | | | | | | | | |
|---|---|---|---|---|---|---|---|---|---|---|---|---|
| | A | D | A-D | R | D-R | A-D-R | I | R-I | D-R-I | A | I-A | R-I-A |
| Key press duration (ms) | 100 | 80 | --- | 100 | --- | --- | 80 | --- | --- | 90 | --- | --- |
| Key press interval (ms) | --- | --- | 120 | --- | 105 | --- | --- | 120 | --- | --- | 100 | --- |
| Key press time gap (ms) | --- | --- | 20 | --- | 25 | --- | --- | 20 | --- | --- | 20 | --- |
| Key press duration (ms) in relation to the next pressed key | --- | --- | 100 | --- | 80 | --- | --- | 100 | --- | --- | 80 | --- |
| Key press interval (ms) in relation to the next pressed key | --- | --- | --- | --- | --- | 120 | --- | --- | 105 | --- | --- | 120 |
| Key press time gap (ms) in relation to the next pressed key | --- | --- | --- | --- | --- | 20 | --- | --- | 25 | --- | --- | 20 |

| KEY STROKE FEATURE TYPES 42 | Keys | | | | | | | | | | |
|---|---|---|---|---|---|---|---|---|---|---|---|
| | A | D | A-D | R | D-R | A-D-R | I | R-I | D-R-I | I-A | R-I-A |
| Key press duration (ms) | 100 90 | 80 | --- | 100 | --- | --- | 80 | --- | --- | --- | --- |
| Key press interval (ms) | --- | --- | 120 | --- | 105 | --- | --- | 120 | --- | 100 | --- |
| Key press time gap (ms) | --- | --- | 20 | --- | 25 | --- | --- | 20 | --- | 20 | --- |
| Key press duration (ms) in relation to the next pressed key | --- | --- | 100 | --- | 80 | --- | --- | 100 | --- | 80 | --- |
| Key press interval (ms) in relation to the next pressed key | --- | --- | --- | --- | --- | 120 | --- | --- | 105 | --- | 120 |
| Key press time gap (ms) in relation to the next pressed key | --- | --- | --- | --- | --- | 20 | --- | --- | 25 | --- | 20 |

| KEY STROKE FEATURE TYPES 42 | Keys | | | | | | | | | | | | | |
|---|---|---|---|---|---|---|---|---|---|---|---|---|---|---|
| | A | D | A-D | R | D-R | A-D-R | I | R-I | D-R-I | I-A | R-I-A | N | A-N | I-A-N |
| Key press duration (ms) | 100 90 | 80 | --- | 100 | --- | --- | 80 | --- | --- | --- | --- | 80 | --- | --- |
| Key press interval (ms) | --- | --- | 120 | --- | 105 | --- | --- | 120 | --- | 100 | --- | --- | 100 | --- |
| Key press time gap (ms) | --- | --- | 20 | --- | 25 | --- | --- | 20 | --- | 20 | --- | --- | 10 | --- |
| Key press duration (ms) in relation to the next pressed key | --- | --- | 100 | --- | 80 | --- | --- | 100 | --- | 80 | --- | --- | 90 | --- |
| Key press interval (ms) in relation to the next pressed key | --- | --- | --- | --- | --- | 120 | --- | --- | 105 | --- | 120 | --- | --- | 100 |
| Key press time gap (ms) in relation to the next pressed key | --- | --- | --- | --- | --- | 20 | --- | --- | 25 | --- | 20 | --- | --- | 20 |

FIG. 9

| KEY STROKE FEATURE TYPES 42 | Key |||||||||||||||
|---|---|---|---|---|---|---|---|---|---|---|---|---|---|---|
| | A | D | A-D | R | D-R | A-D-R | I | R-I | D-R-I | I-A | R-I-A | N | A-N | I-A-N |
| Key press duration (ms) | 100, 90 | 80 | --- | 100 | --- | --- | 80 | --- | --- | --- | --- | 80 | --- | --- |
| | 95, 95 | 95 | --- | 110 | --- | --- | 90 | --- | --- | --- | --- | 100 | --- | --- |
| | 105, 90 | 75 | --- | 95 | --- | --- | 105 | --- | --- | --- | --- | 110 | --- | --- |
| | 100, 95 | 90 | --- | 90 | --- | --- | 75 | --- | --- | --- | --- | 70 | --- | --- |
| Key press interval (ms) | --- | --- | 120 | --- | 105 | --- | --- | 120 | --- | 100 | --- | --- | --- | --- |
| | --- | --- | 110 | --- | 95 | --- | --- | 105 | --- | 90 | --- | --- | --- | --- |
| | --- | --- | 130 | --- | 130 | --- | --- | 125 | --- | 105 | --- | --- | --- | --- |
| | --- | --- | 115 | --- | 115 | --- | --- | 130 | --- | 120 | --- | --- | --- | --- |
| Key press time gap (ms) | --- | --- | 20 | --- | 25 | --- | --- | 20 | --- | 20 | --- | --- | 100 | --- |
| | --- | --- | 25 | --- | 15 | --- | --- | 30 | --- | 25 | --- | --- | 90 | --- |
| | --- | --- | 30 | --- | 20 | --- | --- | 35 | --- | 20 | --- | --- | 115 | --- |
| | --- | --- | 15 | --- | 25 | --- | --- | 15 | --- | 15 | --- | --- | 105 | --- |
| Key press duration (ms) in relation to the next pressed key | --- | --- | 100 | --- | 80 | --- | --- | 100 | --- | 80 | --- | --- | 90 | --- |
| | --- | --- | 95 | --- | 95 | --- | --- | 110 | --- | 90 | --- | --- | 95 | --- |
| | --- | --- | 105 | --- | 75 | --- | --- | 95 | --- | 105 | --- | --- | 90 | --- |
| | --- | --- | 100 | --- | 90 | --- | --- | 90 | --- | 75 | --- | --- | 95 | --- |
| Key press interval (ms) in relation to the next pressed key | --- | --- | --- | --- | --- | 120 | --- | --- | 105 | --- | 120 | --- | --- | 100 |
| | --- | --- | --- | --- | --- | 110 | --- | --- | 95 | --- | 105 | --- | --- | 90 |
| | --- | --- | --- | --- | --- | 130 | --- | --- | 130 | --- | 125 | --- | --- | 105 |
| | --- | --- | --- | --- | --- | 115 | --- | --- | 115 | --- | 130 | --- | --- | 120 |
| Key press time gap (ms) in relation to the next pressed key | --- | --- | --- | --- | --- | 20 | --- | --- | 25 | --- | 20 | --- | --- | 20 |
| | --- | --- | --- | --- | --- | 25 | --- | --- | 15 | --- | 30 | --- | --- | 25 |
| | --- | --- | --- | --- | --- | 30 | --- | --- | 20 | --- | 35 | --- | --- | 20 |
| | --- | --- | --- | --- | --- | 15 | --- | --- | 25 | --- | 15 | --- | --- | 15 |

FIG. 10

| KEY STROKE FEATURE TYPES 42 | Keys | | | | | | | | | | | | | |
|---|---|---|---|---|---|---|---|---|---|---|---|---|---|---|
| | A | D | A-D | R | D-R | A-D-R | I | R-I | D-R-I | I-A | R-I-A | N | A-N | I-A-N |
| Key press duration (ms) | 85 95 | 90 | --- | 75 | --- | --- | 90 | --- | --- | --- | --- | 90 | --- | --- |
| Key press interval (ms) | --- | --- | 110 | --- | 115 | --- | --- | 110 | --- | 105 | --- | --- | 120 | --- |
| Key press time gap (ms) | --- | --- | 25 | --- | 25 | --- | --- | 35 | --- | 15 | --- | --- | 30 | --- |
| Key press duration (ms) in relation to the next pressed key | --- | --- | 85 | --- | 90 | --- | --- | 75 | --- | 90 | --- | --- | 95 | --- |
| Key press interval (ms) in relation to the next pressed key | --- | --- | --- | --- | --- | 110 | --- | --- | 115 | --- | 110 | --- | --- | 105 |
| Key press time gap (ms) in relation to the next pressed key | --- | --- | --- | --- | --- | 25 | --- | --- | 25 | --- | 35 | --- | --- | 15 |

FIG. 12

| KEY STROKE FEATURE TYPES 42 | Keys | | | | | | | | | | | | | |
|---|---|---|---|---|---|---|---|---|---|---|---|---|---|---|
| | A | D | A-D | R | D-R | A-D-R | I | R-I | D-R-I | I-A | R-I-A | N | A-N | I-A-N |
| Key press duration (ms) | 40 30 | 35 | --- | 40 | --- | --- | 15 | --- | --- | --- | --- | 10 | --- | --- |
| Key press interval (ms) | --- | --- | 45 | --- | 15 | --- | --- | 22 | --- | 28 | --- | --- | 47 | --- |
| Key press time gap (ms) | --- | --- | 30 | --- | 20 | --- | --- | 37 | --- | 19 | --- | --- | 33 | --- |
| Key press duration (ms) in relation to the next pressed key | --- | --- | 40 | --- | 10 | --- | --- | 40 | --- | 35 | --- | --- | 30 | --- |
| Key press interval (ms) in relation to the next pressed key | --- | --- | --- | --- | --- | 45 | --- | --- | 15 | --- | 22 | --- | --- | 28 |
| Key press time gap (ms) in relation to the next pressed key | --- | --- | --- | --- | --- | 30 | --- | --- | 20 | --- | 37 | --- | --- | 19 |

FIG. 13

| KEY STROKE FEATURE TYPES 42 | Key 82 | | | | | | | | | | | | AVERAGE DISTANCE SCORES 84 |
|---|---|---|---|---|---|---|---|---|---|---|---|---|---|
| | A | D | A-D | R | D-R | A-D-R | I | R-I | D-R-I | I-A | R-I-A | N | A-N | I-A-N | |
| Key press duration (ms) | 40, 30 | 35 | --- | 40 | --- | --- | 15 | --- | --- | --- | --- | 10 | --- | --- | 28 |
| Key press interval (ms) | --- | --- | 45 | --- | 15 | --- | --- | 22 | --- | 28 | --- | --- | 47 | --- | 31 |
| Key press time gap (ms) | --- | --- | 30 | --- | 20 | --- | --- | 37 | --- | 19 | --- | --- | 33 | --- | 28 |
| Key press duration (ms) in relation to the next pressed key | --- | --- | 40 | --- | 10 | --- | --- | 40 | --- | 35 | --- | --- | 34 | --- | 32 |
| Key press interval (ms) in relation to the next pressed key | --- | --- | --- | --- | --- | 45 | --- | --- | 15 | --- | 22 | --- | --- | 28 | 28 |
| Key press time gap (ms) in relation to the next pressed key | --- | --- | --- | --- | --- | 30 | --- | --- | 20 | --- | 37 | --- | --- | 19 | 27 |

FIG. 14

METHODS AND SYSTEMS FOR AUTHENTICATING A USER

BACKGROUND OF THE INVENTION

This invention relates generally to methods and systems for authenticating users, and more particularly, to methods and systems for authenticating a user based on key stroke data.

It has been known since the nineteenth century to authenticate users based on typing patterns of telegraph operators. More recently, it has also been known to authenticate users according to typing characteristics on physical keyboards. With the advent of mobile devices, efforts have been made to authenticate users based on keystroke dynamics resulting from typing on mobile device touch keyboards.

Authentication methods based on key stroke information generated as a result of typing on a physical keyboard are typically based on typing cadence, that is, the length of time between successive key presses. For mobile devices, the same key stroke information is typically used as well as data generated by sensors within the mobile device. The generated data is typically regarding how users hold and type on a mobile device. The mobile device sensors may include an accelerometer and a gyroscope.

Authenticating a user based on key stroke data generated as a result of typing on a physical keyboard typically involves transforming the key stroke data into key stroke dynamic features. For mobile devices, it is also known to extract data regarding device movement from the data generated by the accelerometer and the gyroscope, and use the extracted data to facilitate authenticating users.

Known methods of authenticating users based on key stroke data involve creating an enrollment template and during an authentication transaction, an authentication template. The templates contain features which are compared to decide if the user who typed during the authentication transaction is the same user who typed during enrollment.

Several methods of comparing enrollment and authentication templates are known and include distance-based methods, one-class classifier methods, and two-class classifier methods. Distance-based methods use some distance metric to compute the distance between the enrollment data and the authentication data. One-class classifier methods use one-class classifiers trained solely on the data of one user and attempt to detect when a new sample is different enough from the pre-learned enrollment data. Two-class classifier methods use two-class classifiers which rely on samples collected from a genuine user and impostors. The method endeavors to find the peculiarities of key stroke data that makes a user different from other users.

The two-class classifier method typically performs the best. However, data from a genuine user and other users is required in order to train a two-class classifier. Such training is typically unrealistic because several users need to type the exact same content which may also pose a security problem if authentication is performed on personal information like emails, passwords, or bank details.

BRIEF DESCRIPTION OF THE INVENTION

In one aspect, a method for authenticating a user is provided that includes capturing, by a computing device, key stroke data generated as a result of a user typing content into the computing device, and calculating feature values from the key stroke data. The method also includes calculating distance scores from the feature values, calculating average distance scores from the distance scores, and entering the average distance scores into a classifier. The user is successfully authenticated when the classifier verifies the identity of the user.

In another aspect, a computing device for authenticating a user is provided that includes a processor and a memory configured to store data. The computing device is associated with a network and the memory is in communication with the processor. The memory has instructions stored thereon which, when read and executed by the processor, cause the computing device to capture key stroke data generated as a result of a user typing content into the computing device and to calculate feature values from the key stroke data. Moreover, the instructions when read and executed by the processor further cause the computing device to calculate distance scores from the feature values and average distance scores from the distance scores, enter the average distance scores into a classifier, and successfully authenticate the user when the classifier verifies the identity of the user.

In yet another aspect, a method for creating training samples is provided that includes calculating, by a computing device, from key stroke data of a user a plurality of feature values that each correspond to one of a plurality of key stroke feature types. Moreover, the method includes obtaining an enrollment template of the user that includes distance functions, and inputting each feature value into a respective distance function to calculate a set of distance scores for each key stroke feature type. Furthermore, the method includes averaging each set of distance scores to calculate an average distance score for each key stroke feature type, creating a vector from the average distance scores, and creating a training sample by combining the vector with a class value.

BRIEF DESCRIPTION OF THE DRAWINGS

FIG. 2 is a key stroke timeline illustrating example key stroke data;

FIGS. 3-10 are tables including example key stroke feature types and example feature values calculated from the key stroke data as shown in FIG. 2;

FIG. 12 is a table similar to the table shown in FIG. 9; however, the table includes feature values calculated from key stroke data captured during an authentication transaction;

FIG. 13 is a table similar to the table shown in FIG. 12; however, the table includes distance scores;

FIG. 14 is a table similar to the table shown in FIG. 13 further including average distance scores;

DETAILED DESCRIPTION OF THE INVENTION

Figure 1:
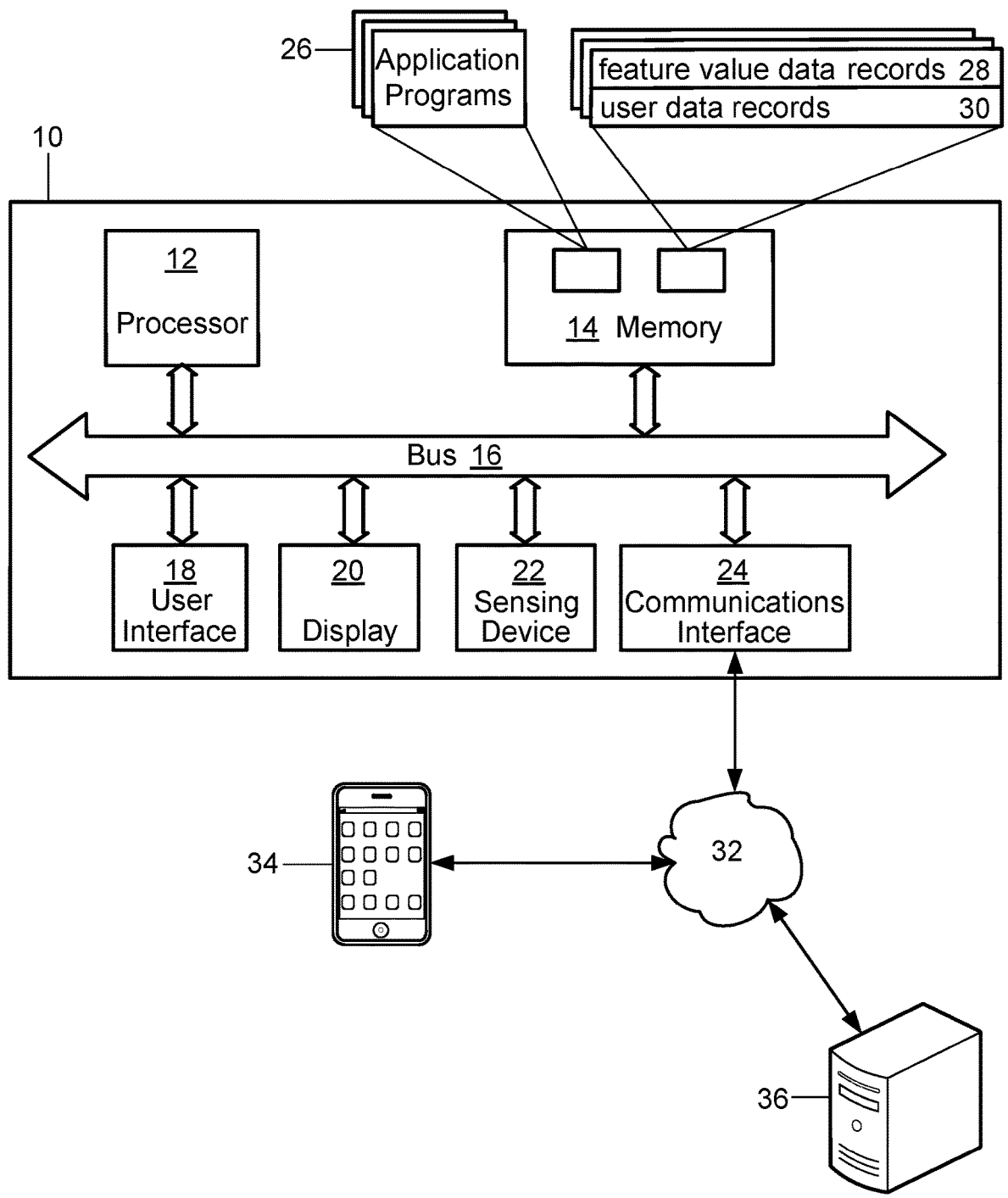
FIG. 1 is a diagram of an example computing device used for authenticating users.

FIG. 1 is a diagram of an example computing device 10 used for authenticating users. The computing device 10 includes components such as, but not limited to, one or more processors 12, a memory 14, a bus 16, a user interface 18, a display 20, a sensing device 22 and a communications interface 24. General communication between the components in the computing device 10 is provided via the bus 16.

The computing device 10 may be any device capable of performing the functions described herein. One example of the computing device 10 is a personal computer (PC). Other examples of the computing device 10 include, but are not limited to, a smart phone, a tablet computer, a phablet computer, a laptop computer, and any type of device having wired or wireless networking capabilities such as a personal digital assistant (PDA). When the computing device 10 is a portable device like a smart phone, the components of the computing device 10 may also include a gyroscope (not shown), an accelerometer (not shown), and a magnetometer (not shown) that generate data as the computing device 10 is operated.

The processor 12 executes instructions, or computer programs, stored in the memory 14. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

As used herein, the term "computer program" is intended to encompass an executable program that exists permanently or temporarily on any non-transitory computer-readable recordable medium that causes the computing device 10 to perform at least a portion of the functions and/or methods described herein. Application programs 26, also known as applications, are computer programs stored in the memory 14. Application programs 26 include, but are not limited to, an operating system, an Internet browser application, enrollment applications, authentication applications, applications that use pre-trained models based on machine learning algorithms, and any special computer program that manages the relationship between application software and any suitable variety of hardware that helps to make-up a computer system or computing environment.

Authentication applications enable the computing device 10 to conduct authentication transactions with any type of authentication data. Authentication transactions include verification transactions and identification (1:N) transactions, where "N" is a number of candidates. The process of verifying the identity of a user is a verification transaction.

Machine learning algorithm applications include at least classifiers and regressors. Machine learning algorithms may process data to generate a classification model. For example, a machine learning algorithm may process key stroke data to train a classifier which may be used to facilitate verifying user identities during authentication transactions. Examples of such machine learning algorithms include, but are not limited to, support vector machine learning algorithms, linear discriminant analysis learning algorithms, and artificial neural network learning algorithms.

The memory 14 may be any non-transitory computer-readable recording medium used to store data including, but not limited to, computer programs, feature value data records 28, and user data records 30. Each user is associated with a set of feature value data records 28. The set of feature value data records 28 for a user stores feature values for that user only. Each feature value data record in the set of records 28 for a user corresponds to a different feature.

The user data record 30 for each user may include key stroke data, classifier training samples, record templates and personal data of the user. The keystroke data may be captured during an enrollment process, while training a classifier, or during authentication transactions. Key stroke data captured during the enrollment process may be processed to generate an enrollment template for the user. As described herein, templates comprise a list of distance functions which are used to facilitate verifying the identities of users during authentication transactions.

Key stroke data is generated when keys corresponding to the characters of content are pressed and released on a physical keyboard or a mobile device virtual keyboard. Content may be any information required by a website or by an application 26 running on the computing device 10. Examples of content include, but are not limited to, usernames, passwords, credit card numbers, email addresses and telephone numbers. Moreover, content may be any word, or any other combination of letters, numbers, special characters, and altering keys. Content may be specific to the user typing the content.

The same or different content may be typed to make a purchase from a merchant via the network 32 versus conducting a financial transaction with a financial institution via the network 32. Content may be entered into the computing device 10 for reasons other than conducting network-based transactions. For example, content may be entered into the computing device 10 in order to unlock the computing device 10 or to access restricted data stored on the computing device 10.

Personal data includes any demographic information regarding a person such as, but not limited to, a person's name, gender, age, date-of-birth, address, citizenship and marital status. Each user data record 30 may also include any kind of data that may be used to enhance the accuracy and trustworthiness of authentication transaction results generated by classifiers as described herein.

An authentication data requirement is the data desired to be captured from a user during either a verification or identification transaction. For the example methods described herein, the authentication data requirement is key stroke data. Additionally, or alternatively, the authentication data requirement may include any other data that can be obtained that is related to typing data into a physical keyboard or mobile device virtual keyboard. Such other data may include data generated by the accelerometer (not shown), gyroscope (not shown), and magnetometer (not shown) included in a portable device like a smart phone.

Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writable or re-writable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the non-transitory computer-readable recording media may be implemented as smart cards, SIMs, any type of physical and/or virtual storage, or any other digital source such as a network or the Internet from which a computing device can read computer programs, applications or executable instructions.

The user interface 18 and the display 20 allow interaction between a user and the computing device 10. The display 20 may include a visual display or monitor that displays information to a user. For example, the display 20 may be a Liquid Crystal Display (LCD), active matrix display, plasma display, or cathode ray tube (CRT). The user interface 18 may include a keypad, a keyboard, a mouse, an infrared light source, a microphone, cameras, and/or speakers.

The user interface 18 and the display 20 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the user to interact with the device 10 to enter data, change settings, control functions, etc. Consequently, when the touch screen is touched, the user interface 18 communicates this change to the processor 12, and settings can be changed or user entered information can be captured and stored in the memory 14.

The sensing device 22 may include Radio Frequency Identification (RFID) components or systems for receiving information from other devices. The sensing device 22 may also include components with Bluetooth, Near Field Communication (NFC), infrared, or other similar capabilities. The computing device 10 may alternatively not include the sensing device 22.

The communications interface 24 provides the computing device 10 with two-way data communications. Moreover, the communications interface 24 enables the computing device 10 to conduct wireless communications such as cellular telephone calls and to wirelessly access the Internet over a network 32. By way of example, the communications interface 24 may be a digital subscriber line (DSL) card or modem, an integrated services digital network (ISDN) card, a cable modem, or a telephone modem to provide a data communication connection to a corresponding type of telephone line. As another example, the communications interface 24 may be a local area network (LAN) card (e.g., for Ethernet™ or an Asynchronous Transfer Model (ATM) network) to provide a data communication connection to a compatible LAN. As yet another example, the communications interface 24 may be a wire or a cable connecting the computing device 10 with a LAN. Further, the communications interface 24 may include peripheral interface devices, such as a Universal Serial Bus (USB) interface, a PCMCIA (Personal Computer Memory Card International Association) interface, and the like. Thus, it should be understood the communications interface 24 may enable the computing device 10 to conduct any type of wireless or wired communications such as, but not limited to, accessing the Internet. Although the computing device 10 includes a single communications interface 24, the computing device 10 may alternatively include multiple communications interfaces 24.

The communications interface 24 also allows the exchange of information across the network 32. The exchange of information may involve the transmission of radio frequency (RF) signals through an antenna (not shown). Moreover, the exchange of information may be between the computing device 10 and a computing device 34 associated with a different user and a computer system 36 capable of communicating over the network 32. Although one computing device 34 and one computer system 36 are illustrated in FIG. 1, it should be understood that any number of computing devices 34 and any number of computer systems 36 may communicate via the network 32 with the computing device 10 and with any other computing devices 34 (not shown) and any other computer systems 36 (not shown) operable to communicate over the network 32.

The computing device 34 associated with a user and each computer system 36 includes components and applications similar to those described herein for the computing device 10. As a result, the computing device 34 associated with each user and each computer system 36 may perform the same functions described herein for the computing device 10.

The computing devices 34 at least capture and process key stroke data generated by users as a result of typing on the computing device 34 and generates data as a user operates the computing device 34. The key stroke data is captured by the computing device 34 of a user when content is typed via the user computing device 34 into a website, email application 26, or any other type of application 26 that may be run by the computing device 34 associated with a user. A user as described herein is a person who types on a physical keyboard or a mobile device virtual keyboard. A mobile device virtual keyboard may be displayed by, for example, a smart phone, a tablet computer, a laptop, and like devices.

The network 32 may be a 5G communications network. Alternatively, the network 32 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 32 may also be any type of wired network or a combination of wired and wireless networks.

Example computing devices 34 include, but are not limited to, smart phones, tablet computers, phablet computers, laptop computers, personal computers and cellular phones. Each computing device 34 is typically associated with a different user. Alternatively, or additionally, a computing device 34 may be associated with any individual or with any type of entity including, but not limited to, commercial and non-commercial entities. A computing device 34 may be associated with a user in many different ways. For example, the computing device 34 may belong to the user's employer and be operated by the user or it may be a personal computing device 34 owned and operated by the user. Example computer systems 36 include computer systems of service providers such as, but not limited to, financial institutions, medical facilities, national security agencies, merchants, and authenticators. The computing devices 10, 34 and the computer systems 36 may alternatively be referred to as information systems.

FIG. 2 is a key stroke timeline 40 illustrating example key stroke data generated as a result of using the computing device 34 associated with a user to type content during an enrollment process. For the example timeline 38, the computing device 34 is a PC and the example content is "Adrian" typed on the physical keyboard of the PC.

The timeline 38 begins at the time the key corresponding to the first letter in the content is pressed and ends when the key corresponding to the last letter in the content is released. More specifically, the timeline 38 begins at time t=0 seconds when the key corresponding to the letter "A" is pressed and ends at time t=625 milliseconds (ms) when the key corresponding to the letter "N" is released. The key corresponding to the letter "A" is referred to herein as the "A" key, the key corresponding to the letter "D" is referred to herein as the "D" key, the key corresponding to the letter "R" is referred to herein as the "R" key, and so on.

Key stroke data includes the character of the pressed key as well as the times at which the key was pressed and released. For the key stroke timeline 38, the key stroke data is as follows: for the first "A" key, press time was at time t=0 seconds and release time was at t=100 milliseconds (ms); for the "D" key, press time was at time t=120 ms and release time was at time t=200 ms; for the "R" key, press time was at time t=225 ms and release time was at 325 ms; for the "I" key, press time was at time t=345 ms and release time was at time t=425 ms; for the second "A" key, the press time was at time t=445 ms and release time was at time t=535 ms; and for the "N" key, press time was at 545 ms and release time was at time t=625 ms.

Although the key stroke timeline 38 reflects key strokes typed during an enrollment process, other key stroke timelines including key stroke data different from that in the timeline 38 may be generated during at least different enrollment processes and during authentication transactions.

FIG. 3 is a table 40 including example key stroke feature types 42 and an example feature value calculated from the key stroke timeline 38 as shown in FIG. 2 for the "A" key. Captured key stroke data is characterized according to key stroke feature types 42. For content entered via a PC there are six key stroke feature types 42 which include key press duration, key press interval, key press time gap, key press duration in relation to the next pressed key, key press interval in relation to the next pressed key, and key press time gap in relation to the next pressed key.

For content entered via a smart phone or like device there may be a total of ninety-six key stroke feature types 42 because the accelerometers and gyroscopes included in such devices cause additional features to be created for each key pressed. Examples of accelerometer features include, but are not limited to, the average accelerometer value for each dimension between a key press and key release, and the minimum accelerometer value between two consecutive key presses. Additionally, or alternatively, the key stroke feature types 42 may include any other information associated with single or multiple key strokes.

A feature is defined by a combination of a key stroke feature type 42 and a key or keys. For example, the key press duration feature type 42 and the "A" key define the feature key press duration of "A". As another example, the key press interval and the "A" and "D" keys define the feature key press interval between the "A" and "D" keys. Each key stroke feature type 42 and key combination defines a different feature.

Each feature is measured, and the measurement is called a feature value. Thus, a feature value may be calculated for the key press duration of each pressed key, the key press interval between consecutively pressed keys, the key press time gap between consecutively pressed keys, the key press duration in relation to the next pressed key, the key press interval in relation to the next pressed key, and the key press time gap in relation to the next pressed key.

The key press duration is the time during which a key is pressed while a user is typing so is calculated as the difference between the press and release times of a key. The key press duration requires a single key be typed while the other key stroke feature types 42 require at least two. The key press interval is the time between pressing two consecutive keys from the start of pressing one key to the start of pressing a next key so is calculated as the difference between the press times of two consecutive keys. The keys may be for the same or different characters. The key press time gap is the time between releasing a currently pressed key and pressing the next key so is calculated as the difference between the release time of the currently pressed key and the press time of the next pressed key. It is possible for the key press time gap to be a negative value because a user may press the next key before releasing the currently pressed key which is considered press overlap. The key press duration for one key in relation to the next pressed key is the same as the key press duration for one key; however, the key press duration data is stored separately for each different next pressed key. The key press interval in relation to the next pressed key is the same as the key press interval; however, the key press interval data is stored separately for each different next pressed key. Lastly, the key press time gap in relation to the next pressed key is the same as the key press time gap; however, the key press time gap data is stored separately for each different next pressed key.

The feature value for the key press duration of the "A" key is calculated as the difference between the press and release times of the "A" key, that is, 100 ms−0 ms=100 ms. Thus, the example feature value for the key press duration of the letter "A" is 100 ms. The table 40 defines six example key stroke feature types 42, but includes a feature value for the key press duration of the letter "A" only because the key for the first letter only of the content was pressed.

FIG. 4 is a table 44 similar to the table 40 shown in FIG. 3 further including four additional example feature values calculated from key stroke data generated as a result of pressing and releasing the "D" key after the "A" key was released. The table 44 includes a total of five example feature values. The feature value for the key press duration of the "D" key is 80 ms. The feature value of the key press interval between the "A" key and the "D" key is 120 ms, the feature value of the key press time gap between the "A" key and the "D" key is 20 ms, and the feature value of the key press duration of the "A" key in relation to the next pressed "D" key is 100 ms.

FIG. 5 is a table 46 similar to the table 44 shown in FIG. 4 further including six additional example feature values calculated from key stroke data generated as a result of pressing and releasing the "R" key after releasing the "D" key. The table 46 includes a total of eleven example feature values. The feature value of the key press duration of the "R" key is 100 ms, the feature value of the key press interval between the "D" and "R" keys is 105 ms, the feature value of the key press time gap between the "D" and "R" keys is 25 ms, the feature value of the key press duration of key "D" in relation to the next pressed key "R" is 80 ms, the feature value for the key press interval between keys "A" and "D" in relation to the next pressed key "R" is 120 ms, and the feature value for the key press time gap between keys "A" and "D" in relation to the next pressed key "R" is 20 ms. The feature value of the key press interval between keys "A" and "D" in relation to the next pressed key "R" is the same as the feature value of the key press interval calculated between the "A" and "D" keys. Likewise, the feature value of the key press time gap between keys "A" and "D" in relation to the next pressed key "R" is the same as the feature value of the key press time gap between the "A" and "D" keys.

FIG. 6 is a table 48 similar to the table 46 shown in FIG. 5 further including six additional example feature values calculated from key stroke data generated as a result of pressing and releasing the "I" key after releasing the "R" key. The table 48 includes a total of seventeen feature values.

FIG. 7 is a table 50 similar to the table 48 shown in FIG. 6 further including six additional example feature values calculated from key stroke data generated as a result of pressing and releasing the "A" key after releasing the "I" key. The table 50 includes a total of twenty-three feature values. The key press duration of the "A" key pressed after releasing the "I" key is 90 ms. The key press duration of the "A" key is considered to be the same feature as the first "A" key press duration. As a result, the second "A" key column included in the table 50 is redundant.

FIG. 8 is a table 52 similar to the table 50 shown in FIG. 7; however, the column for the second pressed "A" key has been removed and the key press duration feature value of 90 ms is included in the column for the first pressed "A" key. As a result, the table 52 includes the same feature values as the table 50.

FIG. 9 is a table 54 similar to the table 52 shown in FIG. 8 further including six additional example feature values calculated as a result of pressing and releasing the "N" key after releasing the "A" key. The table 54 includes a total of twenty-nine example feature values which are all of the feature values calculated as a result of entering the content "Adrian".

Although the table 54 includes feature values calculated for each feature resulting from consecutively typing keys in the content, the table 54 may additionally, or alternatively, include features and corresponding feature values resulting from nonconsecutively typed keys. For example, features created by pressing and releasing every second or third key. Examples of such features include, but are not limited to, the time between every second or third typed key. To account for such nonconsecutively typed keys, the table 54 would be modified to include new features and corresponding feature values.

Sometimes users may make a mistake when typing content. For example, a user may type "Adriab", then delete the "b" and type "n" to yield "Adrian". Despite having typed the same content, it is not possible to calculate the key press interval and key press time gap between the "A" and "N" keys, as these keys were not typed consecutively. As a result, feature values cannot be calculated for these features. However, additional features may be included in the table 54 that account for typing errors. Such features may include, but are not limited to, the key press duration of the "B" key and the key press interval between the "A" and "B" keys. Thus, it should be understood that the number and set of features and corresponding feature values may depend on the typed content including content generated as a result of typing mistakes.

The table 54 includes feature values calculated as a result of entering the content "Adrian" once. Typically, content should be repeatedly entered to generate an adequate number of feature values to determine the typing patterns of users. Thus, although a single feature value is included in the table 54 for most of the features a plurality of feature values may be included for each feature.

FIG. 10 is an example table 56 similar to the table 54 as shown in FIG. 9 further including, for each feature, feature values calculated as a result of entering the content four times during the enrollment process.

Each feature for which feature values were calculated includes four feature values. However, the key press duration of the "A" key has eight feature values because the "A" key is pressed and released twice each time the content "Adrian" is typed. The feature values shown in the table 56 may be stored in the feature value data record 28 of the user for the corresponding feature. For example, the feature values calculated for the key press time gap between the "A" and "D" keys may be stored in the feature value data record 28 of the user corresponding to the key press time gap between the "A" and "D" keys. Although the table 56 includes feature values calculated as a result of entering the content four times, the table 56 may alternatively include feature values calculated as the result of entering the content any number of times. The greater the number of entries, the greater the amount of data that may be used to describe user typing characteristics.

A distance function is created for each respective feature based on the feature values calculated for the respective feature. Thus, for example, the distance function for the key press duration of the "A" key is created based on eight feature values. The distance function for each other feature is created based on four feature values. The distance functions calculated based on key stroke data captured during the enrollment process are used to create the enrollment template for that user.

Distance functions may be computed using a kernel density estimator approach, where kernels centered on each feature value are accumulated. Any other metric or method to create distance functions can be used, for example a mixture of Gaussian functions, Mahalanobis, Euclidian or Manhattan distances may be used. The distance functions described herein calculate distance scores between the range of zero and one hundred. However, the distance functions may alternatively calculate distance scores within any range that facilitates training classifiers that are capable of generating accurate and trustworthy authentication transaction results.

Figure 11:
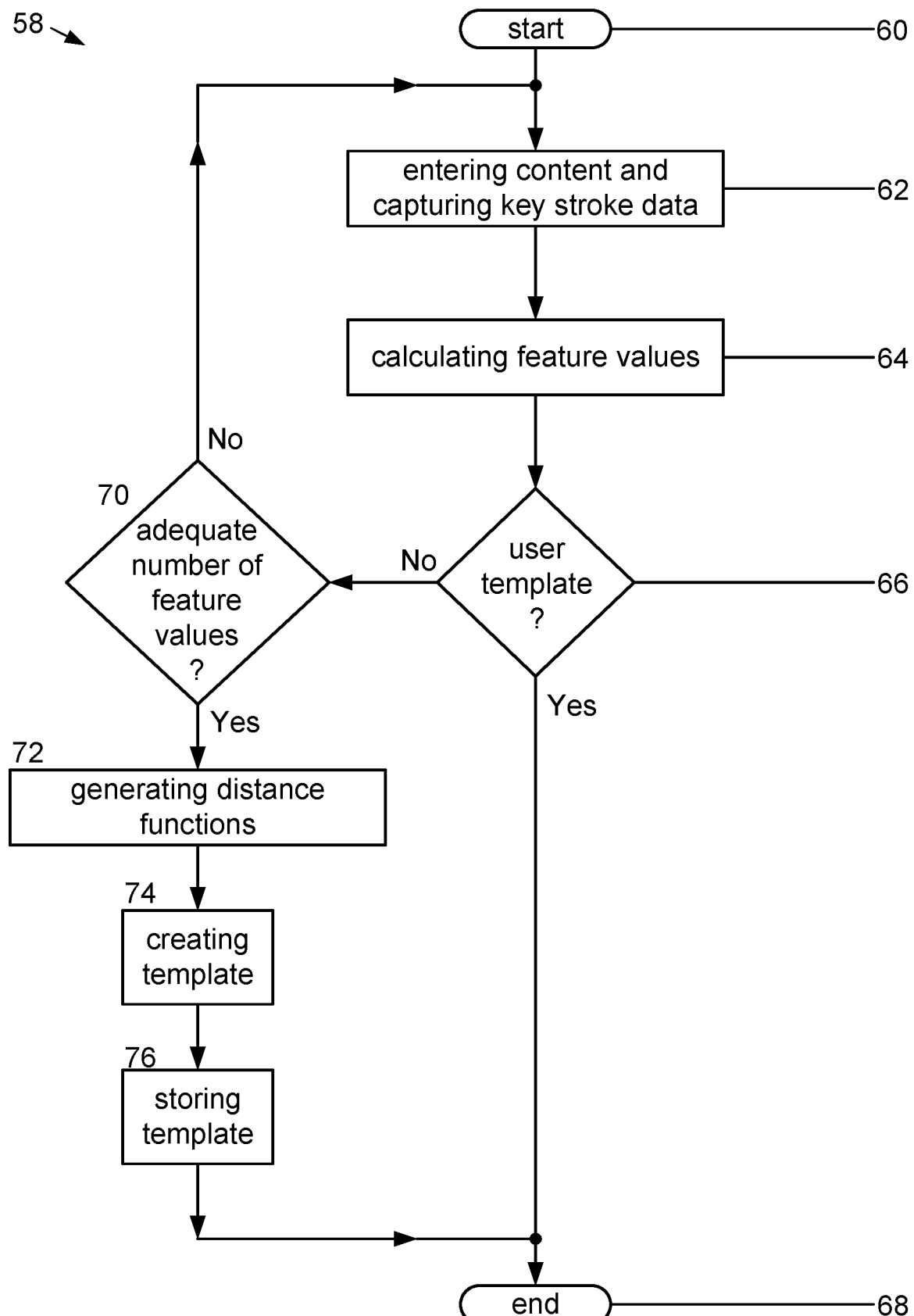
FIG. 11 is a flowchart illustrating an example enrollment process for ensuring an enrollment template for a user has been created.

FIG. 11 is a flowchart 58 illustrating an example enrollment process for ensuring an enrollment template for a user has been created. The method starts 60 with a user entering 62 content into a computing device 34 with which the user is associated. The content is "Adrian" which is entered into the computing device 34 by typing. While the content is entered 62, the computing device 34 continues by capturing 62 key stroke data created as a result of entering 62 the content and transmitting the captured key stroke data to the computing device 10. In response to receiving the captured key stroke data, the computing device 10 continues by calculating 64 feature values.

Next, processing continues by deciding 66 whether or not an enrollment template for the user has already been created. More specifically, processing continues by searching the computing device 10 for an enrollment template of the user. If an enrollment template for the user is stored 66 in the computing device 10, processing ends 68. However, if an enrollment template for the user is not 66 stored in the computing device 10, processing continues by determining 70 whether or not an adequate number of feature values have been calculated from which an enrollment template for the user may be created.

In this example method an adequate number of feature values are available to create a template after entering the content four times. The number of feature values deemed adequate depends on the number of characters included in the entered content, and the number of feature values calculated each time the content is entered. Generally, content that includes a smaller number of characters should be entered a greater number of times, and content that includes a greater number of characters should be entered fewer times. For example, an email address typed on a physical keyboard may be entered four times whereas a sentence typed on a physical keyboard may be entered twice to generate an adequate number of feature values.

If there is not an adequate number of feature values 70, processing continues by prompting the user to continue by again entering 62 the content. However, if there is an adequate number of feature values 70, processing continues by generating 72 a distance function for each feature for which at least one feature value was calculated, creating 74 an enrollment template based on the calculated distance functions, and storing 76 the enrollment template in the computing device 10. Next, processing ends 68.

FIG. 12 is a table 78 similar to the table 54 shown in FIG. 9. However, the table 78 includes feature values calculated from key stroke data captured during an authentication transaction.

During an authentication transaction in which the identity of a user is being verified, the distance functions listed in the enrollment template of the user are used to calculate distance scores. More specifically, the feature value or values calculated for a respective feature during the authentication transaction are inputted into the distance function from the template of the user for the respective feature, and the distance function calculates a distance score for the respective feature. A distance score is likewise calculated for each feature having a feature value. The distance score is zero if the inputted feature value is considered very similar or identical to the values used to create the respective distance function. The distance score is large if the difference between the inputted feature value and the feature values used to create the respective distance function is large.

FIG. 13 is a table 80 similar to the table 78 shown in FIG. 12. However, instead of including feature values the table 80 includes a distance score calculated for each corresponding feature value included in the table 78.

FIG. 14 is a table 82 similar to the table 80 shown in FIG. 13 further including an average distance score 84 for each key stroke feature type 42. Each average distance score 84 is calculated based on the distance scores for a different key stroke feature type 42. More specifically, all of the distance scores calculated for a key stroke feature type 42 are averaged to calculate the average distance score 84 for that key stroke feature type 42. For example, the five distance scores for the key press interval feature type are averaged to yield an average distance score of thirty-one (31). When calculating the average distance score 84 for a key stroke feature type 42, all of the feature values calculated for the feature type are used regardless of the key or combination of keys used to calculate the feature values.

Having one average distance score 84 for each feature type 42 allows obtaining a fixed set of average distances 84 that can be computed based on the same or different typed content. This facilitates training and using classifiers that can accurately distinguish between genuine users and impostors regardless of the content typed and the features used.

Key stroke data samples are captured from a plurality of users before training a classifier. Each user enters requested content into the computing device 34 with which he or she is associated. The computing device 34 captures key stroke data created as a result of typing the content and transmits the captured key stroke data to the computing device 10 for storage therein. The captured key stroke data is a key stroke data sample. Alternatively, or additionally, the captured key stroke data samples may be stored in the computing device 34 associated with the user or any other computer system 36. Each user enters the requested content twenty times and the computing device 34 associated with the user transmits each of the twenty captured key stroke data samples to the computing device 10. Alternatively, the content may be entered any number of times that facilitates training classifiers that generate accurate and trustworthy authentication transaction results. Of the twenty key stroke data samples captured for each user, four are used to create a template for the respective user in accordance with the method described herein with regard to FIG. 11. Alternatively, any number of key stroke data samples may be used to create the templates. The templates may be stored in the computing device 10 or any other computing device 34 or computer system 36. Key stroke data samples not used for creating the template are referred to herein as remaining key stroke data samples.

For the example methods and systems described herein key stroke data is captured from one hundred users. However, key stroke data may alternatively be captured from any number of users that facilitates training classifiers that generate accurate and trustworthy authentication transaction results.

Figure 15:
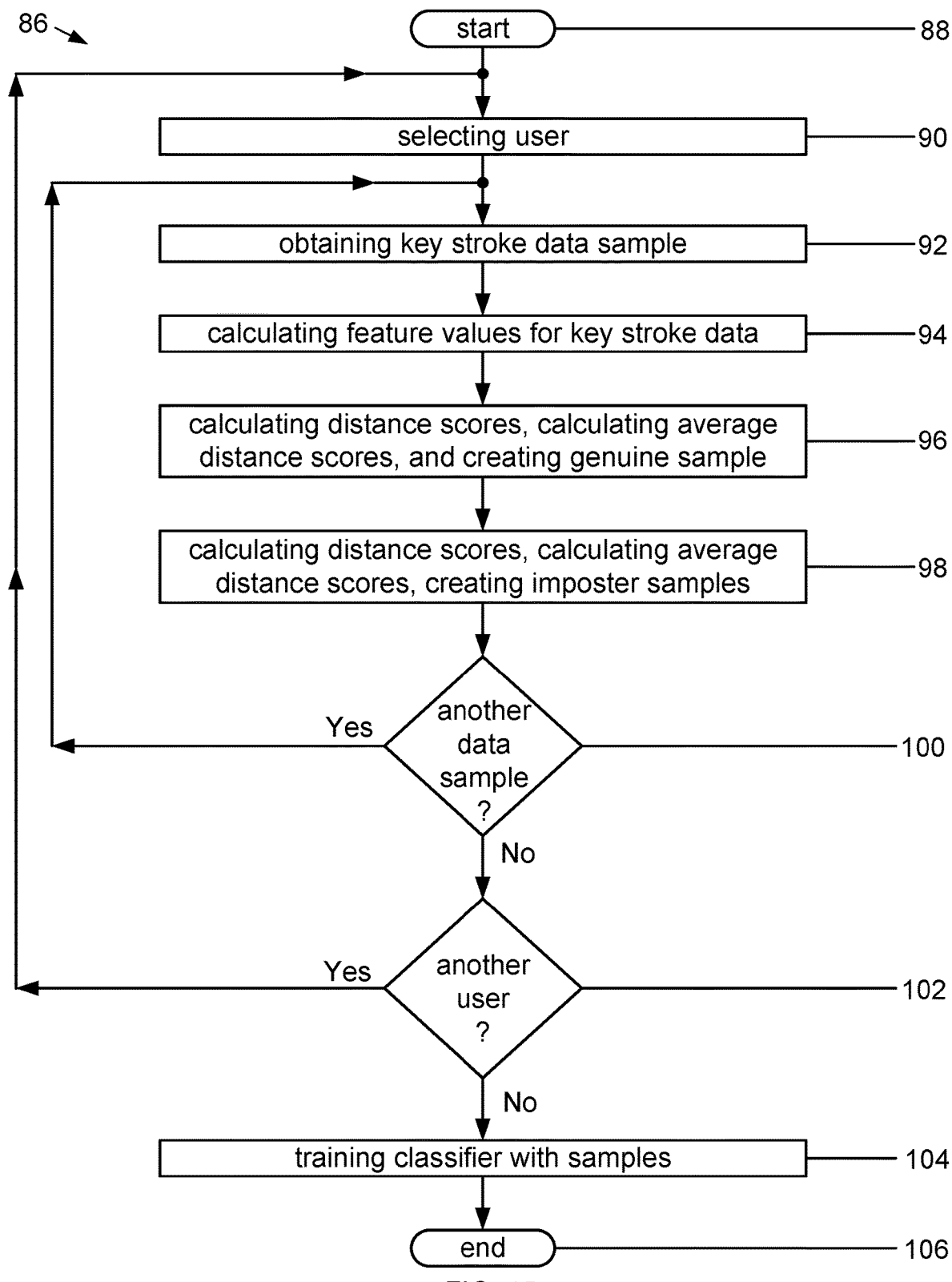
FIG. 15 is a flowchart illustrating an example method of creating classifier training samples and training a classifier with the samples.

FIG. 15 is a flowchart 86 illustrating an example method of creating classifier training samples and training a classifier with the samples. The method starts 88 with the computing device 10 selecting 90 a user for creating training samples, obtaining 92 one of the remaining key stroke data samples of the selected user, calculating 94 feature values from the selected key stroke data sample, obtaining the enrollment template of the user, calculating 96 distance scores using the distance functions listed in the obtained template (ADRIA, see paragraph [0070] which describes this process), and calculating 96 average distance scores. The user is one of the one hundred users from whom key stroke data samples were captured.

In this example method, six average distance scores are calculated and are used to create a vector which is used with a class value to create a genuine training sample 96. The class value is one if the vector was created from key stroke data entered by a selected user and is zero if created from key stroke data entered by a non-selected user. A non-selected user is considered to be an imposter.

After creating 96 the genuine training sample, processing continues by obtaining the enrollment template of each non-selected user and calculating 98 distance scores based on the template of each non-selected user. More specifically, processing continues by inputting the calculated feature values into the distance functions of each obtained enrollment template and thus calculating 98 ninety-nine sets of distance scores, calculating 98 a set of average distance scores for each set of distance scores, and creating 98 an imposter training sample from each set of average distance scores. As a result, ninety-nine imposter training samples are created. Each set of average distance scores includes six average distance scores. It should be understood that each imposter training sample corresponds to a different non-selected user. After creating 98 the imposter training samples, processing continues by deciding 100 whether another remaining key stroke data sample of the selected user is to be used for creating additional training samples. If all of the key stroke data samples of the selected user have not been used to create classifier training samples, processing continues by obtaining 92 another one of the remaining key stroke data samples of the selected user.

Otherwise, when another key stroke data sample 100 is not required, processing continues by deciding 102 whether the key stroke data of another user is to be used for generating genuine and imposter training samples. Key stroke data samples of another user are required when key stroke data samples of all users has not been used for generating training samples. Thus, when training samples have not been generated from the key stroke data of all users, processing continues by selecting 90 another user whose key stroke data samples have not been used to generate training samples.

However, when the key stroke data samples of all users have been used to generate genuine and imposter training samples, processing continues by training 104 the classifier with all of the genuine and imposter training samples. Next, processing ends 106.

The classifier is trained with genuine and imposter training samples because classifiers trained with genuine and imposter training samples provide the most accurate and trustworthy authentication transaction results. Moreover, the accuracy of classifiers at distinguishing between imposters and genuine users increases as the number of training samples increases and decreases as the number of training samples decreases.

Although many contemporary authentication approaches rely on a different classifier for each user, a classifier trained as described herein may be used to conduct authentication transactions for the entire population of the earth. That is, the classifiers are not user dependent. Moreover, a classifier trained as described herein may be used on any computing device 34 or computer system 36 having the same key stroke feature types 42 used to train the classifier. Thus, a single classifier only need be trained for each different set of key stroke feature types 42 and corresponding computing devices 34 or computer systems 36.

Figure 16:
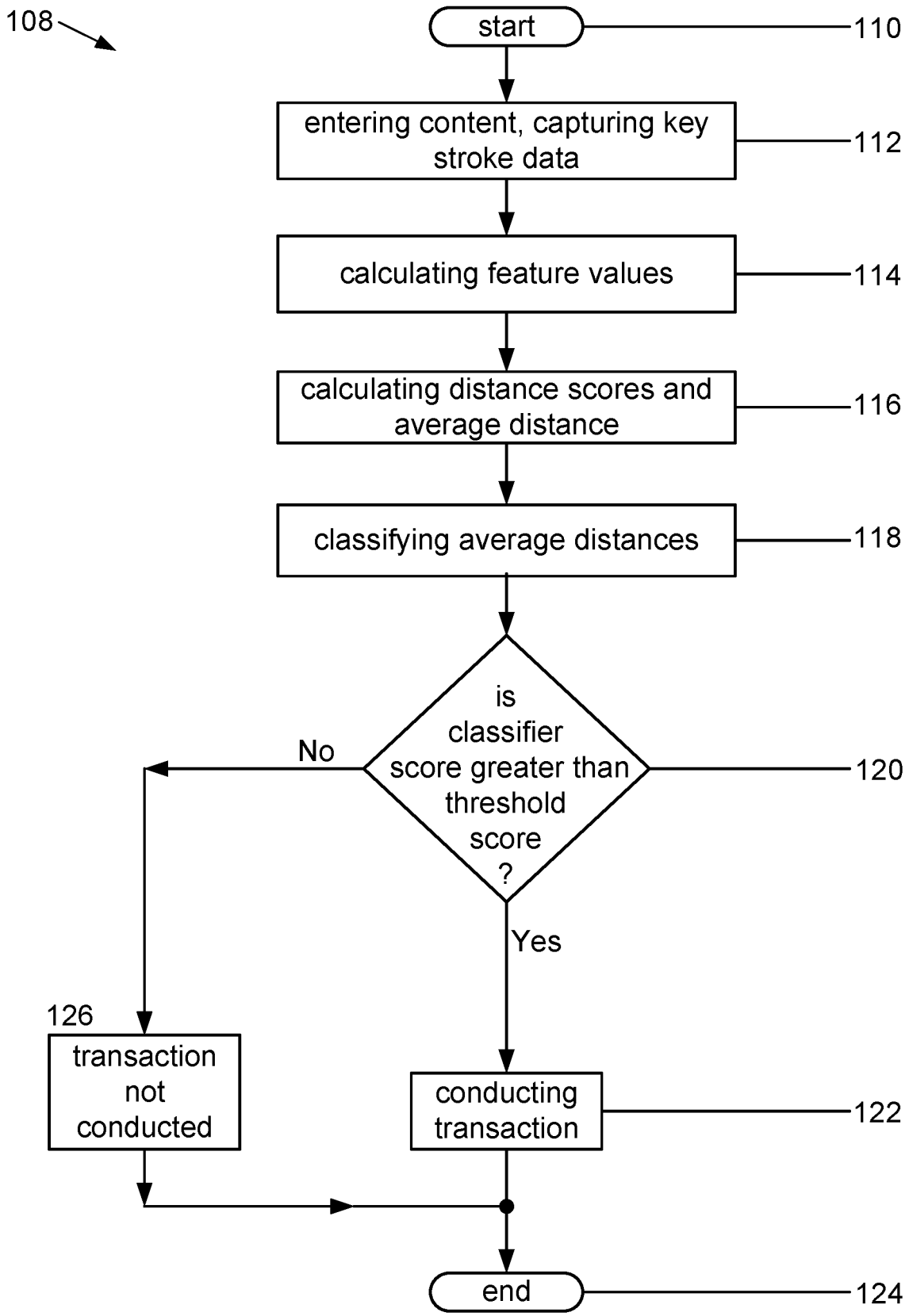
FIG. 16 is a flowchart illustrating an example method for authenticating a user with the trained classifier.

FIG. 16 is a flowchart 108 illustrating an example method for authenticating a user with the trained classifier. The method starts 110 with a user entering 112 content into a computing device 34 the user is associated with during an authentication transaction. The content is the same as entered during the enrollment process for the user. While the content is entered 112 the computing device 34 continues by capturing 112 key stroke data created as a result of entering 112 the content, calculating 114 a feature value for each feature, calculating 116 a distance score from each feature value, and calculating 116 an average distance score for each key stroke feature type 42.

Next, processing continues by classifying 118 the average distance scores using the trained classifier. More specifically, processing continues by entering the average distance scores into the trained classifier which calculates a classifier score, and comparing 120 the classifier score against a threshold score. When the classifier score exceeds the threshold score the identity of the user is successfully authenticated. After being successfully authenticated, the user is permitted to conduct 122 a desired transaction and processing ends 124. However, when the classifier score is less than or equal to the threshold score, the desired transaction is not conducted 126 and processing ends 124. As described herein each average distance score is a classifier feature.

As the number of characters in the content increases, the accuracy and trustworthiness of verification transaction results also increases.

Although the computing device 34 associated with the user captures the key stroke data and conducts the authentication transaction in the example authentication method, the computing device 34 may alternatively transmit the captured key stroke data to the computing device 10 for conducting the authentication transaction with the trained classifier. Moreover, although the user is successfully authenticated when the classifier score exceeds the threshold score in the example authentication method, depending on the standards established for successfully authenticating users, the user may alternatively be successfully authenticated when the classifier score satisfies the threshold score by being at least equal to the threshold score, less than or equal to the threshold score, less than the threshold score, or equal to the threshold score.

The example methods described herein may be conducted entirely by the computing device 10 or the computing device 34 associated with a user, partly by the computing device 10 and partly by the computing device 34 associated with a user, or partly by the computing device 10 and partly by other computer systems 36 (not shown) and computing devices 34 (not shown) capable of communicating over the network 32. Moreover, the example methods described herein may be conducted entirely on the other computer systems 36 (not shown) and computing devices 34 (not shown). Thus, it should be understood that the example methods described herein may be conducted on any combination of computers and computer systems. Furthermore, data described herein as being stored in the computing device 10, the computing device 34 associated with a user, or a computer system 36 may alternatively be stored in any computer system (not shown) or any computing device (not shown) capable of communicating with the computing device 10 over the network 32. Additionally, the example methods described herein may be implemented with any number and organization of computer program components. Thus, the methods described herein are not limited to specific computer-executable instructions. Alternative example methods may include different computer-executable instructions or components having more or less functionality than described herein.

In example embodiments, the above-described methods and systems enhance the accuracy and trustworthiness of user authentication based on key stroke data. More specifically, feature values are calculated from key stroke data captured during an authentication transaction, distance scores are calculated from the feature values, and an average distance score is calculated from the distance scores of each different key stroke feature type. One vector is made from the average distance scores and is entered into a classifier. The user is successfully authenticated when the classifier verifies the identity of the user. As a result, the accuracy and trustworthiness of authentication transaction results based on key stroke data are facilitated to be enhanced. Moreover, accurate and trustworthy authentication transaction results may be generated despite small variation in the typed content due to typing mistakes made while entering content.

In additional example embodiments, the above-described methods and systems facilitate training classifiers with fewer classifier features relative to contemporary methods. More specifically, feature values are calculated from key stroke data captured for a genuine user, distance scores are calculated from the feature values, and an average distance score is calculated for each key stroke feature type. The average distance scores function as classifier features. Thus, the number of classifier features is the same as the number of key stroke feature types, regardless of the content typed. When additional genuine data is not required, key stroke data of imposters is obtained and used to calculate feature values, distance scores and classifier features for each imposter. A vector is created for each genuine user and imposter using his or her respective classifier features. Moreover, each vector is associated with a class value which is zero for imposters and one for genuine users. The vectors and respective class values are entered into the classifier for training. As a result, the training of classifiers for generating accurate and trustworthy authentication transactions results is facilitated to be enhanced while using less training data than contemporary methods.

The example methods for authenticating users and training classifiers described above should not be considered to imply a fixed order for performing the method steps. Rather, the method steps may be performed in any order that is practicable, including simultaneous performance of at least some steps. Moreover, the method steps may be performed in real time or in near real time. It should be understood that, for any process described herein, there can be additional, fewer, or alternative steps performed in similar or alternative orders, or in parallel, within the scope of the various embodiments, unless otherwise stated. Furthermore, the invention is not limited to the embodiments of the methods described above in detail. Rather, other variations of the methods may be utilized within the spirit and scope of the claims.

What is claimed is:

1. A method for authenticating a user comprising the steps of:
   capturing, by a computing device, key stroke data generated as a result of a user typing content into the computing device;
   calculating feature values from the key stroke data, each feature value being calculated for any one of a plurality of features, each feature being defined by a combination of a key stroke feature type and at least one key;
   calculating a distance score for each feature using a different distance function for each respective feature and the feature values calculated for the respective feature, wherein the different distance functions are calculated and included in an enrollment template for the user during enrollment and are unique to the user;
   calculating an average distance score for each feature from the respective distance scores;
   entering the average distance scores into a classifier; and
   successfully authenticating the user when the classifier verifies the identity of the user.

2. A method according to claim 1, said successfully authenticating step comprising the steps of:
   calculating a classifier score;
   comparing the classifier score against a threshold score; and
   successfully authenticating the identity of the user when the classifier score satisfies the threshold score.

3. A method according to claim 1 said calculating a distance score step comprising the steps of:
   obtaining the enrolment template of the user, the enrolment template including the different distance functions, wherein each distance function corresponds to a different feature;
   inputting the feature value for each feature into the corresponding distance function; and
   calculating, by the corresponding distance functions, a distance score for each different feature.

4. A method according to claim 1, said calculating an average distance score step comprising the steps of:
   identifying the distance scores that correspond to each of a plurality of key stroke feature types; and
   averaging the distance scores for each key stroke feature type.

5. A computing device for authenticating a user comprising:
   a processor; and
   a memory configured to store data, said computing device being associated with a network and said memory being in communication with said processor and having instructions stored thereon which, when read and executed by said processor, cause said computing device to:
   capture key stroke data generated as a result of a user typing content into said computing device;
   calculate feature values from the key stroke data, each feature value being calculated for any one of a plurality of features, each feature being defined by a combination of a key stroke feature type and at least one key;
   calculate a distance score for each feature using a different distance function for each respective feature and the feature values calculated for the respective feature, wherein the different distance functions are calculated and included in an enrollment template for the user during enrollment and are unique to the user;
   calculate an average distance score for each feature from the respective distance scores;
   enter the average distance scores into a classifier; and
   successfully authenticate the user when the classifier verifies the identity of the user.

6. A computing device according to claim 5, wherein the instructions when read and executed by said processor further cause said computing device to:
   calculate a classifier score;
   compare the classifier score against a threshold score; and
   successfully authenticate the identity of the user when the classifier score satisfies the threshold score.

7. A computing device according to claim 5, wherein the instructions when read and executed by said processor further cause said computing device to:
   obtain the enrolment template of the user, the enrolment template including the different distance functions, wherein each distance function corresponds to a different feature;
   input the feature value for each feature into the corresponding distance function; and
   calculate, using the corresponding distance functions, a distance score for each different feature.

8. A computing device according to claim 5, wherein the instructions when read and executed by said processor further cause said computing device to:
   identify the distance scores that correspond to each of a plurality of key stroke feature types; and
   average the distance scores for each key stroke feature type.

9. A non-transitory computer-readable recording medium in a computer for authenticating a user, the non-transitory computer-readable recording medium storing instructions which when executed by a hardware processor cause the non-transitory recording medium to perform steps comprising:
   calculating feature values from key stroke data, each feature value being calculated for any one of a plurality of features, each feature being defined by a combination of a key stroke feature type and at least one key;
   calculating a distance score for each feature using a different distance function for each respective feature and the feature values calculated for the respective feature, wherein the different distance functions are calculated and included in an enrollment template for the user during enrollment and are unique to the user;
   calculating an average distance score for each feature from the respective distance scores;
   entering the average distance scores into a classifier; and
   successfully authenticating the user when the classifier verifies the identity of the user.

10. The non-transitory computer-readable recording medium according to claim 9, wherein the instructions when read and executed by said processor, cause said non-transitory computer-readable recording medium to perform steps comprising:
   calculating a classifier score;
   comparing the classifier score against a threshold score; and
   successfully authenticating the identity of the user when the classifier score satisfies the threshold score.

11. The non-transitory computer-readable recording medium according to claim 9, wherein the instructions when read and executed by said processor, cause said non-transitory computer-readable recording medium to perform steps comprising:
   obtaining the enrolment template of the user, the enrolment template including the different distance functions, wherein each distance function corresponds to a different feature;
   inputting the feature value for each feature into the corresponding distance function; and
   calculating, by the corresponding distance functions, a distance score for each different feature.

12. The non-transitory computer-readable recording medium according to claim 9, wherein the instructions when read and executed by said processor, cause said non-transitory computer-readable recording medium to perform steps comprising:
   identifying the distance scores that correspond to each of a plurality of key stroke feature types; and
   averaging the distance scores for each key stroke feature type.

* * * * *